(12) United States Patent
Xie

(10) Patent No.: US 9,995,188 B2
(45) Date of Patent: Jun. 12, 2018

(54) OIL CONTROL DEVICE FOR FULLY VARIABLE HYDRAULIC VALVE SYSTEM OF INTERNAL COMBUSTION ENGINE

(71) Applicant: Shandong University, Jinan (CN)

(72) Inventor: Zongfa Xie, Jinan (CN)

(73) Assignee: Shandong University, Jinan (CN)

( * ) Notice: Subject to any disclaimer, the term of this patent is extended or adjusted under 35 U.S.C. 154(b) by 357 days.

(21) Appl. No.: 14/902,268

(22) PCT Filed: Aug. 12, 2013

(86) PCT No.: PCT/CN2013/000948
§ 371 (c)(1),
(2) Date: Dec. 30, 2015

(87) PCT Pub. No.: WO2015/006886
PCT Pub. Date: Jan. 22, 2015

(65) Prior Publication Data
US 2016/0237865 A1 Aug. 18, 2016

(30) Foreign Application Priority Data

Jul. 15, 2013 (CN) .......................... 2013 1 0296611
Jul. 15, 2013 (CN) .......................... 2013 2 0419127

(51) Int. Cl.
*F01L 9/02* (2006.01)
*F01L 1/344* (2006.01)
*F16K 11/076* (2006.01)

(52) U.S. Cl.
CPC .............. *F01L 9/025* (2013.01); *F01L 1/344* (2013.01); *F01L 9/02* (2013.01); *F16K 11/076* (2013.01);
(Continued)

(58) Field of Classification Search
CPC ..... F01L 9/02; F01L 9/025; F01L 1/34; F01L 1/344; F01L 2001/34426; F01L 2001/34446; F01L 2820/02; F01L 2820/03
(Continued)

(56) References Cited

U.S. PATENT DOCUMENTS 3,361,121 A   1/1968 Schott
5,002,022 A * 3/1991 Perr .................. F01L 9/025
                                                  123/90.12
6,227,154 B1  5/2001 Wakeman

FOREIGN PATENT DOCUMENTS

CN        103174490 A     6/2013
WO     WO 03/102383 A1   12/2003

OTHER PUBLICATIONS

International Search Report and Written Opinion dated Apr. 23, 2014 for Application No. PCT/CN2013/000948.

* cited by examiner

*Primary Examiner* — Phutthiwat Wongwian
*Assistant Examiner* — Loren Edwards
(74) *Attorney, Agent, or Firm* — Knobbe Martens Olson & Bear LLP

(57) ABSTRACT

The present invention relates to a valve train mechanism and a fuel supply system of internal combustion engine, and particularly relates to an oil control device of a hydraulic fully variable valve system of the internal combustion engine. This device connected with the hydraulic valve system of internal combustion engine, the device consists of a housing, a rotary valve, a hydraulic accumulator and a transmission mechanism. The rotary valve, the hydraulic accumulator and the transmission mechanism are installed in the housing. The rotary valve consists of a rotary valve shaft and a rotary valve sleeve. The hydraulic accumulator con- (Continued)

Figure 1:
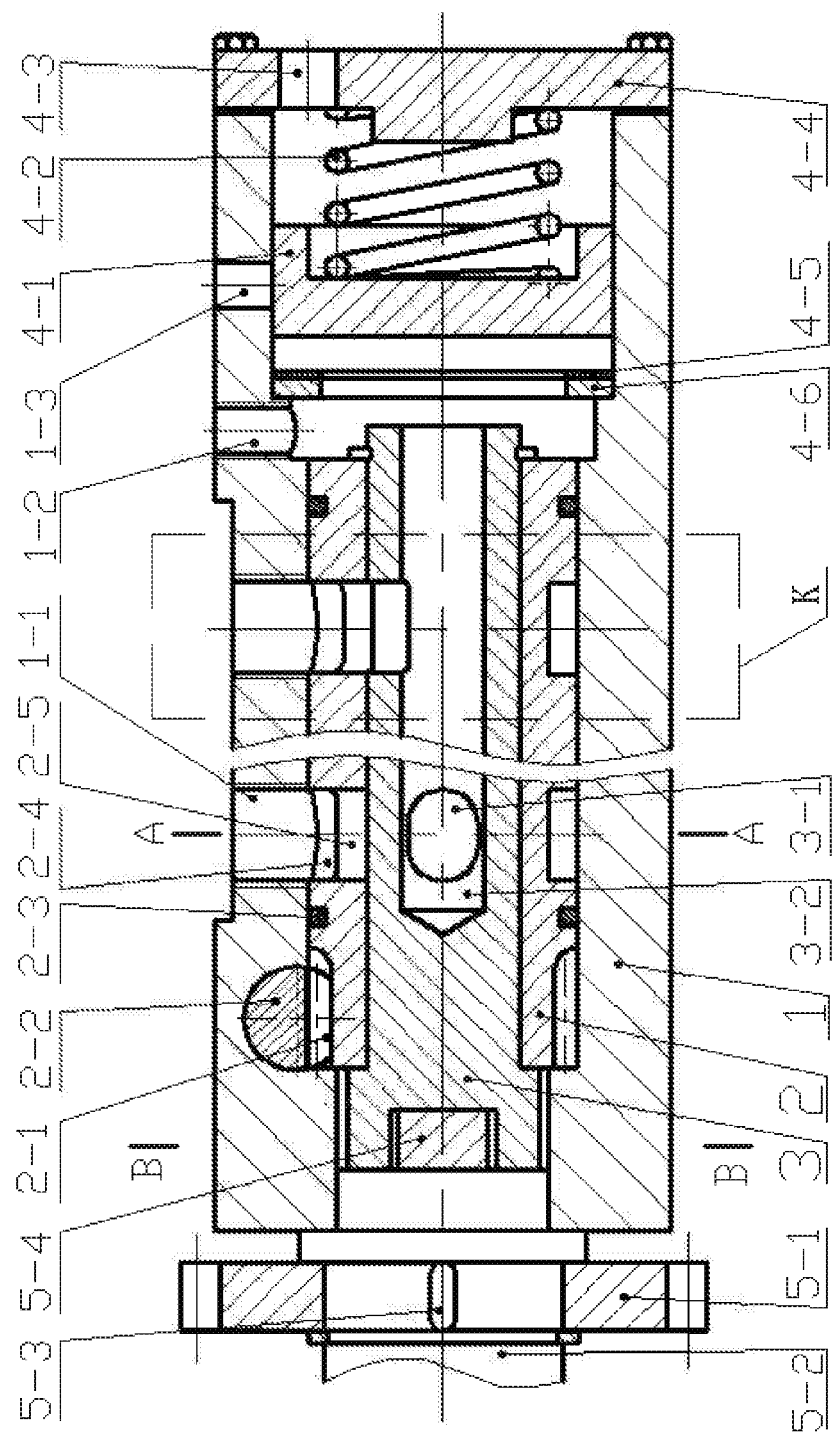

sists of an accumulator piston, an accumulator spring, an end cover, a sealing seat ring and a rubber gasket and is installed in the cavity at one end of the housing. An accumulator chamber is provided between the rotary valve and the hydraulic accumulator. The transmission mechanism consists of a transmission gear, a gear shaft and a cross slide coupling. The transmission gear is installed on the gear shaft, while the gear shaft is connected with the rotary valve shaft through the cross slide coupling. The present invention can replace a high-frequency solenoid valve, it is applicable to use with hydraulic fully variable valve system of single-cylinder and multi-cylinder internal combustion engines. And the present invention has the advantages of simple structure, reliability, good manufacturability and low cost.

4 Claims, 3 Drawing Sheets

(52) U.S. Cl.
CPC ............... *F01L 2001/34426* (2013.01); *F01L 2001/34446* (2013.01); *F01L 2810/02* (2013.01); *F01L 2820/03* (2013.01)
(58) Field of Classification Search
USPC .............................. 123/90.12, 90.16, 90.17
See application file for complete search history.

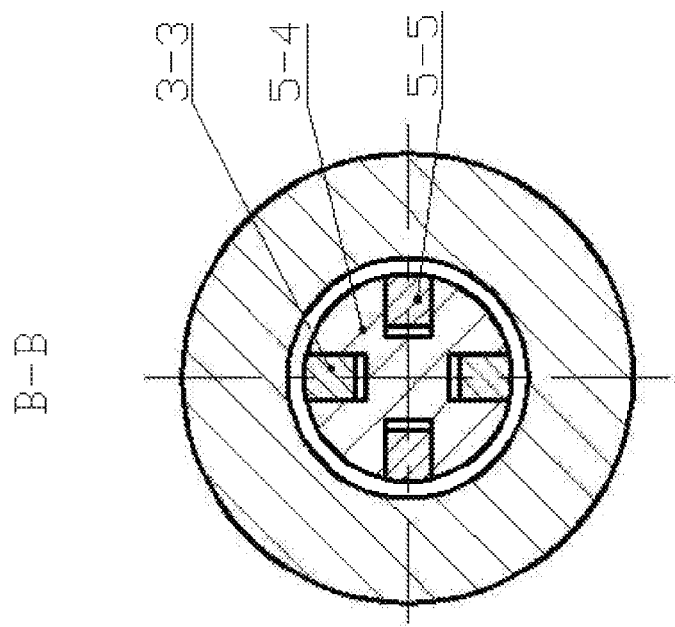
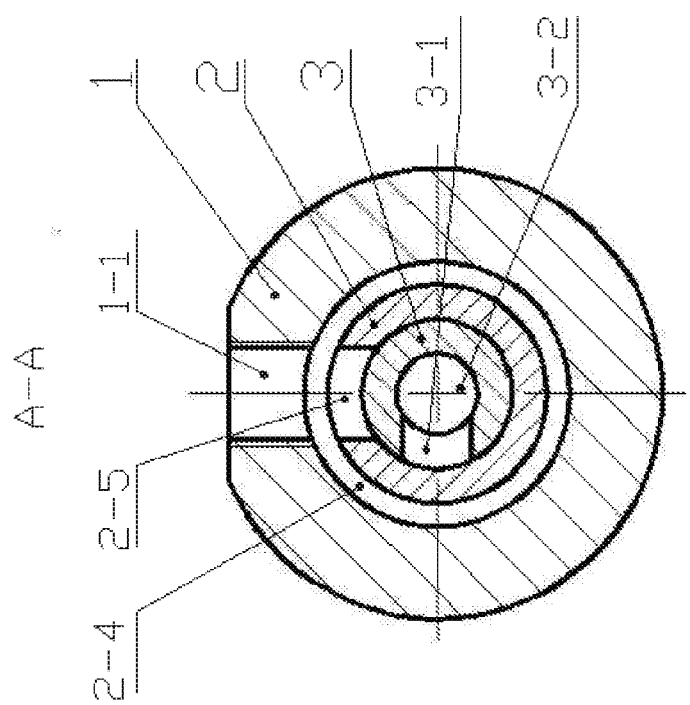
Figure 3
Figure 2

OIL CONTROL DEVICE FOR FULLY VARIABLE HYDRAULIC VALVE SYSTEM OF INTERNAL COMBUSTION ENGINE

1. FIELD OF THE INVENTION

The present invention relates to a valve train mechanism and a fuel supply system of internal combustion engine, and particularly relates to an oil control device of a hydraulic fully variable valve system of the internal combustion engine.

2. BACKGROUND OF THE INVENTION

A hydraulic valve system of an internal combustion engine can achieve continuous variation of maximum valve lift, valve opening duration angle and valve train phase at the same time, and such a valve system is called a Hydraulic Fully Variable Valve System (HFVVS). HFVVS has an important role in energy conservation and emission reduction for the internal combustion engine. Currently, the representative HFVVSs are the Schaeffler Uniair system, the Ford's Electronic-hydraulic Fully Variable Valve System, the Lotus's EHFVVT system and the like, which all use high-frequency solenoid valves as oil control switches to control hydraulic oil inflow and outflow. However, the high-frequency solenoid valves have the disadvantages of low frequency response speed, low reliability and high cost.

Invention patent No. ZL200610042070.9, entitled "Valve Train System of Internal Combustion Engine with Continuously Variable Valve Timing", was published by Chinese State Intellectual Property Office in 2006. It provides a valve train system of an internal combustion engine with continuously variable valve timing, which includes a valve assembly, a hydraulic cylinder assembly, a hydraulic cylinder outlet control device, a hydraulic cylinder inlet control device, and a camshaft driving assembly. However, the system has the problem of instable working because the hydraulic low-pressure system has big pressure fluctuation in the process of oil discharging from the hydraulic cylinder. The hydraulic system has the problem of hydraulic oil leakage to result in air entry in the work stopping period of the internal combustion engine. The outlet control device of the hydraulic cylinder also has the limitation of being not applicable to a multi-cylinder internal combustion engine due to structure defects, and has the problem of unstable transmission. These problems lead to unfeasible popularization and application of this system.

3. SUMMARY OF THE INVENTION

The object of the present invention is to provide an oil control device applicable to HFVVS of single-cylinder and multi-cylinder internal combustion engines. The oil control device operates stably, works reliably and is strongly universal, to overcome the defects of the prior art.

The present invention is a part of the HFVVS of internal combustion engine, and employs the following technical solution: the device consists of a housing, a rotary valve, a hydraulic accumulator and a transmission mechanism. The rotary valve, the hydraulic accumulator and the transmission mechanism are installed in the housing. The rotary valve consists of a rotary valve shaft and a rotary valve sleeve. The rotary valve shaft is installed in the rotary valve sleeve with gear teeth on one end thereof, and the rotary valve sleeve is installed in the cavity of the housing. On the housing, a rack rail is provided at a position corresponding to the gear teeth of the rotary valve sleeve, and a rack in the rack rail is engaged with the gear teeth on the rotary valve sleeve. The hydraulic accumulator installed in the cavity of the housing consists of an accumulator piston, an accumulator spring, an end cover, a sealing seat ring and a rubber gasket. The sealing seat ring and the rubber gasket are fixedly installed in the housing cavity, the accumulator piston is flexibly installed in the cavity of the housing, the end cover is fixedly installed on the end surface of the housing, and the accumulator spring which is a pressure spring is installed between the accumulator piston and the end cover. An accumulator chamber is provided between the rotary valve and the hydraulic accumulator. The transmission mechanism consists of a transmission gear, a gear shaft and a cross slide coupling. The transmission gear is installed on the gear shaft through a connecting key, while the gear shaft is connected with the rotary valve shaft through the cross slide coupling.

An axial blind hole, a radial oil hole communicated therewith are provided on the rotary valve shaft. A retaining ring groove is provided at one end of the rotary valve shaft. Two connecting teeth matched with the teeth space of the cross slide coupling are provided at the other end. The rotary valve shaft is installed in the rotary valve sleeve, and a retaining ring for axial positioning is installed in the retaining ring groove. On the rotary valve sleeve, radial oil holes are provided at an axial position corresponding to the radial oil hole of the rotary valve shaft, and an annular groove is provided at the position on the radial oil hole of the rotary valve sleeve. The rotary valve sleeve with the rotary valve shaft is installed in the cavity of the housing. On the housing, a high pressure oil hole is provided at a position corresponding to the annular groove, and a low pressure oil hole is provided at a position corresponding to the accumulator chamber in axial. A radial oil escape hole is provided at the bottom of the housing cavity in which the accumulator piston moves, and a vent hole is provided on the end cover. Radial oil holes of the rotary valve sleeve are uniformly provided in circumference at an axial position corresponding to the radial oil hole of the rotary valve shaft, the number of which is equal to the rotary speed ratio N (N is a positive integer) of a valve train camshaft to the rotary valve shaft.

A set of rotary valve switch consists of a high pressure oil hole in the housing, an annular groove of the rotary valve sleeve, a radial oil hole of the rotary valve sleeve and a radial oil hole of the rotary valve shaft at the same axial position. At least one set of rotary valve switch should be provided in one oil control device.—The number of the rotary valve switches is equal to that of the cylinders of the internal combustion engine matched therewith for use.

Radial clearance sealing is adopted between the rotary valve shaft and the rotary valve sleeve, while the radial clearance sealing or sealing with a sealed rubber ring is adopted between the rotary valve sleeve and the housing. When sealing with the sealed rubber ring is adopted, the sealed rubber ring is installed in the sealing ring grooves provided at two sides of the annular groove and then is installed in the cavity of the housing. While the radial clearance sealing is adopted, the sealing ring grooves are not needed and the rotary valve sleeve is directly installed in the cavity of the housing. To ensure the rotary valve switch is turned on and off once in a working cycle of the internal combustion engine, the number of the radial oil holes of the rotary valve sleeve is equal to the rotary speed ratio N (N is a positive integer) of the valve train camshaft to the rotary valve shaft. A sealing seat ring of the hydraulic accumulator is installed in the cavity of the housing with interference fit, and the rubber gasket is bonded on the end surface of the sealing seat ring. An accumulator piston is in clearance fit with the cavity of the housing. A transmission gear is installed on a gear shaft with a connecting key, and is positioned axially with a shaft shoulder and a retaining ring. The gear shaft is in clearance fit with the cavity of the housing. Two connecting teeth matched with the tooth space of the cross slide coupling are provided at one end of the gear shaft. Two pairs of connecting tooth space vertical to one another are provided in the cross slide coupling. The gear shift is connected with the rotary valve shaft through the cross slide coupling respectively to ensure that the gear shaft can drive the rotary valve shaft for synchronous rotation.

When in application, the present invention is connected to a hydraulic valve system of an internal combustion engine, the gear shaft in the transmission mechanism of the device is connected with a valve train camshaft of the internal combustion engine through transmission gears. The rack, engaged with the gear teeth on the rotary valve sleeve is connected and controlled by a servo motor or a proportional solenoid. The high pressure oil hole in the housing is connected with the high pressure oil chamber for driving the intake valve. The low pressure oil hole and the oil escape hole in the housing are connected with oil passage of lubrication system of the internal combustion engine.

The transmission gear installed on the gear shaft is driven by the valve train camshaft, when the engine works. The transmission gear drives the gear shaft, the cross slide coupling and the rotary valve shaft successively to rotate. When the radial oil hole of the rotary valve shaft rotates to be not communicated with the radial oil hole of the rotary valve sleeve, the rotary valve switch is in an off state, and the valve train cam drives the hydraulic tappet, so that high pressure oil liquid is generated in the hydraulic driving system to push the hydraulic piston to overcome the resistance of the valve spring to open the valve. In contrast, when the radial oil hole of the rotary valve shaft rotates to be communicated with the radial oil hole of the rotary valve sleeve, the rotary valve switch is in an on state, so the oil liquid in the high pressure oil passage flows in the accumulator chamber and the valve is closed with the action of the force of the valve spring. As rotary valve sleeve can be turned around by the rack driven by a serve motor or a proportional solenoid, the circumferential position of the radial oil hole of the rotary valve sleeve is adjustable along with the operation condition of the internal combustion engine. If the rotary speed ratio N of the valve train camshaft to the rotary valve shaft is 1, when the rotary valve sleeve rotates by $\phi_1$ degrees along the rotary direction of the rotary valve shaft, the communicated phase angle between the radial oil hole of the rotary valve shaft and the radial oil hole of the rotary valve sleeve will be correspondingly delayed by a $2\phi_1$ degree crank angle CA (the crank rotary speed of the four-stroke internal combustion engine is 2 times that of the valve train camshaft), i.e. the opening time and closing time of the rotary valve switch will be correspondingly delayed by a $2\phi_1$ degree CA. Likewise, when the rotary valve sleeve rotates by $\phi_2$ degrees against the rotary direction of the rotary valve shaft, the communicated phase angle between the radial oil hole of the rotary valve shaft and the radial oil hole of the rotary valve sleeve will be correspondingly advanced by a $2\phi_2°$ CA, i.e. the opening time and closing time will be correspondingly advanced by a $2\phi_2°$ CA. Since $\phi_1$ or $\phi_2$ may be continuously changed from 0° to 180°, the opening and closing phase angles of the rotary valve switch can be continuously changed from 0° CA to 360° CA.

The requirement on the coaxiality between the gear shaft and the rotary valve shaft is very high in the driving process, since the rotary valve sleeve and the rotary valve shaft are in precise clearance and sealing fit. So, a cross slide coupling may be used to lower the requirement on the coaxiality, to simplify the manufacturing process and to lower manufacturing cost. The rotary valve switch is intermittently turned on and off, resulting in unstable hydraulic pressure in the accumulator chamber. Hydraulic pressure energy could be stored or released with the accumulator to reduce pressure fluctuation. When the engine stops, the oil pressure in the low pressure system will be gradually reduced along with the leakage of oil liquid. The accumulator piston is tightly compressed on the rubber gasket of the sealing seat ring by the accumulator spring to prevent further leakage of the oil liquid to result in air entry into the hydraulic system, thus ensuring stable operation of the next staring process of the internal combustion engine.

So, the oil control device of the present invention plays a role of a switching valve between the hydraulic driving device and a low pressure system, and, the opening time and closing time (phase angles) could be randomly adjusted within a certain range. The manufacturing process of the oil control device is simple. The oil control device also has the function of sealing oil and storing energy. A corresponding oil control device is matched according to different number of cylinders of the internal combustion engine, and can meet the need of hydraulic fully variable valve mechanisms of single-cylinder and multi-cylinder internal combustion engines.

The present invention has the following advantages:
(1) it can replace a high-frequency solenoid valve, is applicable to use with single-cylinder and multi-cylinder internal combustion engines, and has the advantages of simple structure, reliability and low cost;
(2) it serves the effects of storing energy, stabilizing the oil pressure in the low pressure system, and has smooth operation;
(3) it has good sealing effect, and can prevent air from entering into the hydraulic valve driving system; and
(4) it uses a cross slide coupling, thus simplifying the manufacturing process and lowering the manufacturing cost.

4. BRIEF DESCRIPTION OF THE DRAWINGS

Figure 4:
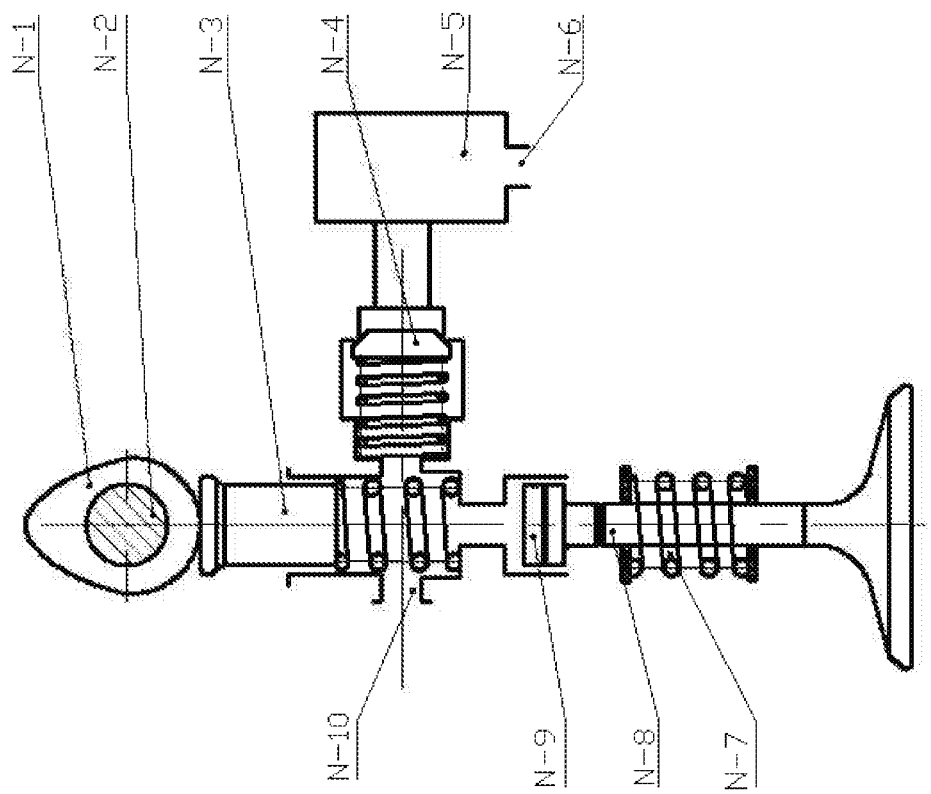

FIG. 1 shows the sectional view of the schematic structure of the present invention;
FIG. 2 shows the sectional view along A-A in FIG. 1;
FIG. 3 shows the sectional view along B-B in FIG. 1;
FIG. 4 shows the structural schematic diagram of the hydraulic fully variable valve system for an internal combustion engine.

REFERENCE SIGNS 1, housing; 1-1, high pressure oil hole; 1-2, low pressure oil hole; 1-3, oil escape hole; 2, rotary valve sleeve; 2-1, gear teeth of rotary valve sleeve; 2-2, rack; 2-3, sealed rubber ring; 2-4, annular groove of rotary valve sleeve; 2-5, radial oil hole of rotary valve sleeve; 3, rotary valve shaft; 3-1, radial oil hole of rotary valve shaft; 3-2, axial blind hole of rotary valve shaft; 3-3, connecting teeth of rotary valve shaft; 4-1, accumulator piston; 4-2, accumulator spring; 4-3, vent hole; 4-4, end cover; 4-5, rubber gasket; 4-6, sealing seat gyring; 5-1, transmission gear; 5-2, gear shaft; 5-3, connecting key; 5-4, cross slide coupling; 5-5, connecting tooth of gear shaft; K, a set of rotary valve switch;

N-1, valve train cam; N-2, valve train camshaft; N-3, hydraulic tappet; N-4, one-way valve; N-5, lubrication system of internal combustion engine; N-6, low pressure oil passage; N-7, valve spring; N-8, valve; N-9, hydraulic piston; N-10, high pressure oil passage.

5. DETAILED DESCRIPTION OF THE EMBODIMENTS

The implementation process of the present invention will be described below with conjunction of the accompanying drawings.

As shown in FIG. 1, FIG. 2 and FIG. 3, the present invention consists of a housing 1, a rotary valve, a hydraulic accumulator and a transmission mechanism. The rotary valve, the hydraulic accumulator and the transmission mechanism are installed in the housing. The rotary valve consists of a rotary valve shaft 3 and a rotary valve sleeve 2. The rotary valve shaft 3 is installed inside the rotary valve sleeve 2 with gear teeth 2-1 on one end, and the rotary valve sleeve 2 is installed in the cavity of the housing 1. On the housing 1, a rack rail is provided at a position corresponding to the gear teeth 2-1 on the rotary valve sleeve 2. A rack 2-2 inside the rack rail is engaged with the gear teeth 2-1. The hydraulic accumulator consists of an accumulator piston 4-1, an accumulator spring 4-2, an end cover 4-4, a sealing seat ring 4-6 and a rubber gasket 4-5. The hydraulic accumulator is installed in the cavity at one end of the housing 1. The sealing seat ring 4-6 and the rubber gasket 4-5 are both fixedly installed in the cavity of the housing 1, the accumulator piston 4-1 is flexibly installed in the cavity of the housing 1, the end cover 4-4 is fixedly installed on the end surface of the housing 1, and an accumulator spring 4-2 is installed between the accumulator piston 4-1 and the end cover 4-4. An accumulator chamber is provided between the rotary valve and the hydraulic accumulator. The transmission mechanism consists of a transmission gear 5-1, a gear shaft 5-2, a connecting key 5-3 and a cross slide coupling 5-4. The transmission gear 5-1 is installed on the gear shaft 5-2 through the connecting key 5-3, while the gear shaft 5-2 is connected with the rotary valve shaft 3 through the cross slide coupling 5-4.

An axial blind hole 3-2, a radial oil hole 3-1 communicated therewith are provided on the rotary valve shaft 3. A retaining ring groove is provided at one end of the rotary valve shaft 3. Two connecting teeth 3-3 matched with the connecting tooth space of the cross slide coupling 5-4 are provided at the other end. The rotary valve shaft 3 is installed inside rotary valve sleeve 2, and a retaining ring for axial positioning is installed in the retaining ring groove. On the rotary valve sleeve 2, a radial oil hole 2-5 is provided at an axial position corresponding to the radial oil hole 3-1 of the rotary valve shaft, and an annular groove 2-4 is provided at the position on the radial oil hole 2-5 of the rotary valve sleeve 2. The rotary valve sleeve 2 with the rotary valve shaft 3 is installed in the cavity of the housing 1. On the housing 1, a high pressure oil hole 1-1 is provided at a position corresponding to the annular groove 2-4 of rotary valve sleeve, and a low pressure oil hole 1-2 is provided at a position corresponding to the accumulator chamber in axial. A radial oil escape hole 1-3 is provided at the bottom of the housing cavity in which the accumulator piston moves, and a vent hole 4-3 is provided on the end cover 4-4.

Radial oil, holes 2-5 of the rotary valve sleeve 2 are uniformly provided on the circumference at the axial position corresponding to the radial oil hole 3-1 of the rotary valve shaft. The number of the radial oil holes 2-5 is equal to the rotary speed ratio N (N is a positive integer) of the valve train camshaft to the rotary valve shaft 3, to ensure that the rotary valve switch is turned on and off once in a working cycle of the internal combustion engine. As shown in FIG. 4, when the rotary speed ratio N of the valve train camshaft N-2 to the rotary valve shaft 3 is 1, there is one radial oil hole 2-5 of the rotary valve sleeve. When the speed ratio N is equal to 2, there are two radial oil holes 2-5 of the rotary valve sleeve at the same axial position, which are uniformly distributed each 180 degrees. When the speed ratio N is equal to 3, there are three radial oil holes 2-5 of the rotary valve sleeve at the same axial position, which are uniformly distributed each 120 degrees, and so on. The circumferential position of the radial oil hole 3-1 of the rotary valve shaft is determined by the ignition sequence of the internal combustion engine.

A set of rotary valve switch K consists of a high pressure oil hole 1-1 in the housing 1, an annular groove 2-4 of the rotary valve sleeve, the radial oil hole 2-5 of the rotary valve sleeve and the radial oil hole 3-1 of the rotary valve shaft at the same axial position. At least one set of rotary valve switch K should be provided in one oil control device, and the number of the rotary valve switch K is equal to that of the cylinders of the internal combustion engine matched therewith for use.

Radial clearance sealing is adopted between the rotary valve sleeve 2 and the rotary valve shaft 3, while the radial clearance sealing or sealing with a sealed rubber ring is adopted between the rotary valve sleeve 2 and the housing 1. When sealing with the sealed rubber ring is adopted, the sealed rubber ring 2-3 is installed in the sealing ring grooves provided at two sides of the annular groove 2-4 and then is installed in the cavity of the housing 1. While the radial clearance sealing is adopted, the sealing ring grooves are not needed and the rotary valve sleeve 2 is directly installed in the cavity of the housing 1. The sealing seat ring 4-6 of the hydraulic accumulator is installed, in the cavity of the housing 1 with, interference fit, and a rubber gasket 4-5 is bonded on the sealing seat ring 4-6 by using a vulcanization process. The accumulator piston 4-1 is installed in the cavity of the housing 1 in clearance fit, and the end cover 4-4 is fixedly installed on the end surface at one end of the housing 1. The compressed accumulator spring 4-2 is installed between the accumulator piston 4-1 and the end cover 4-4. The transmission gear 5-1 is installed on the gear shaft 5-2 with the connecting key 5-3, and is positioned axially with a shaft shoulder and a retaining ring. The gear shaft 5-2 is in clearance fit with the cavity of the housing 1. Two connecting teeth 5-5 matched with the connecting tooth space of the cross slide coupling 5-4 are provided at one end of the gear shaft 5-2. The rotary valve shaft 3 is connected with the gear shaft 5-2 through the cross slide coupling 5-4, to ensure that the gear shaft 5-2 can drive the rotary valve shaft 3 for synchronous rotation. In a multi-cylinder internal combustion engine, connecting teeth could be provided on both ends of the gear shaft 5-2 to connect two independent oil control devices of the present invention.

As shown in FIG. 1 and FIG. 4, when in application, the present invention is connected to the hydraulic valve system of the internal combustion engine. The transmission gear 5-1 is connected with the valve train camshaft N-2 through transmission gears. The rotary speed ratio of the valve train camshaft N-2 to the transmission gear 5-1 is a positive integer N. The rack 2-2 is controlled by a servo motor or a proportional solenoid. The high pressure hole 1-1 in the housing 1 is connected with the high pressure oil passage N-10, and the low pressure hole 1-2 in the housing 1 is connected with the low pressure oil passage N-6.

The transmission gear 5-1 is driven by the valve train camshaft N-2 through the transmission gears when the engine works. When radial oil hole 3-1 of the rotary valve shaft rotates to be not communicated with the radial oil hole 2-5 of the rotary valve sleeve, the rotary valve switch is in an off state. So the cam N-1 drives a hydraulic tappet N-3 to generate high pressure oil liquid, and then high pressure oil liquid pushes a hydraulic piston N-9 to overcome the resistance of the valve spring N-7 to open the valve N-8. When the radial oil hole 3-1 of the rotary valve shaft rotates to be communicated with the radial oil hole 2-5 of the rotary valve sleeve, the rotary valve switch is in an on state, so the oil liquid, in the high pressure oil passage N-10 and the oil liquid in the lubrication system N-5 of the internal combustion engine are intercommunicated, then the high pressure oil liquid flows out, and the valve N-8 will be closed under the action of the valve spring N-7. As the rotary valve sleeve 2 can rotate around the rotary valve shaft 3 by adjusting the rack 2-2, the circumferential position of the radial oil hole 2-5 of the rotary valve sleeve is adjustable. When a four-stroke internal combustion engine works, the number of the radial oil hole 2-5 of the rotary valve sleeve should be 1 if the rotary speed ratio N of the valve train camshaft N-2 to the rotary valve shaft 3 is equal to 1. When the rotary valve sleeve 2 rotates by $\phi_1$ degrees along the rotary direction of the rotary valve shaft 3, the communicated phase angle between the radial oil hole 3-1 of the rotary valve shaft and the radial oil hole 2-5 of the rotary valve sleeve will be correspondingly delayed by a $2\phi_1°$ CA, i.e. the opening time and closing time of the rotary valve switch will be correspondingly delayed by a $2\phi_1°$ CA. Likewise, when the rotary valve sleeve 2 rotates by $\phi_2$ degrees against the rotary direction of the rotary valve shaft 3, the communicated phase angle between the radial oil hole 3-1 of the rotary valve shaft and the radial oil hole 2-5 of the rotary valve sleeve will be correspondingly advanced by a $2\phi_2°$ CA, i.e. the opening time and closing time of the rotary valve switch will be correspondingly advanced by a $2\phi_2°$ CA. Since $\phi_1$ and $\phi_2$ may be continuously changed from 0° to 180°, the opening and closing phase angles of rotary valve switch can be continuously changed from 0° CA, to 360° CA.

The requirement on the installation coaxiality between the gear shaft 5-2 and the rotary valve shaft 3 is very high, since the rotary valve sleeve 2 and the rotary valve shaft 3 are, in precise clearance and sealing fit. So, the requirement on the coaxiality could be lowered with the cross slide coupling 5-4 to simplify the manufacturing process and to lower the manufacturing cost. The rotary valve switch is intermittently turned on and off, resulting in unstable hydraulic pressure in the accumulator chamber, so that hydraulic pressure energy should be stored and released with the accumulator to reduce the pressure fluctuation in the hydraulic system. When the oil pressure in the hydraulic accumulator chamber is higher than the opening pressure of the valve N-8, the oil liquid pushes the accumulator piston 4-1 to compress the accumulator spring 4-2 and then flows out through the oil escape hole 1-3 to maintain the oil pressure in the low pressure system at a certain level. When the internal combustion engine stops, the oil pressure will be gradually reduced along with the leakage of oil liquid in the accumulator chamber. The accumulator spring 4-2 elongates to compress the accumulator piston 4-1 on the rubber gasket 4-5 at last to prevent further leakage of the oil liquid to result in air entry into the hydraulic valve driving system, thus ensuring stable operation of the next staring process of the internal combustion engine.

The oil control device of the present invention can be correspondingly matched according to the number of cylinders of an internal combustion engine, so as to be a device applicable to single-cylinder and multi-cylinder internal combustion engines. At two different positions in axial of the housing 1, the rotary valve sleeve 2 and the rotary valve shaft 3, two independent rotary valve switches K can be formed by two radial oil holes and corresponding two annular grooves provided for two-cylinder internal combustion engine. Clearly, the oil control device with two rotary valve switches is provided with only one set of one rotary valve sleeve 2 and rotary valve shaft 3, and employs only one set of accumulator and one set of transmission mechanism. Likewise, for a three-cylinder internal combustion engine, three independent rotary valve switches K may be provided in the oil control device to form an oil control device applicable to the three-cylinder internal combustion engine. For a four-cylinder internal combustion engine, four independent rotary valve switches K are provided, and so on.

In FIG. 1, a structure that two oil control devices are driven by one gear shaft 5-2 is formed by providing connecting teeth on both sides of the gear shaft 5-2 to meet the use requirements of the multi-cylinder internal combustion engine. So for a multi-cylinder internal combustion engine, two or more sets of oil control devices could be used to meet the matching requirements of the number of the cylinders in the multi-cylinder internal combustion engine. For example, two sets of oil control devices with single rotary valve switch driven by one gear shaft 5-2 could be applied for a two-cylinder internal combustion engine. It could be applied for a three-cylinder internal combustion engine that one set of oil control device with two rotary valve switches driven by one end of gear shaft 5-2 and one set of oil control device with single rotary valve switch driven by the other end thereof. While two sets of oil control devices with two rotary valve switches could be applied for a four-cylinder combustion engine. It could be applied for a six-cylinder internal combustion engine that two sets of oil control devices with three rotary valve switches or three sets of oil control devices with two rotary valve switches. When multiple sets of oil control devices could be used in a multi-cylinder internal combustion engine, and oil liquid in the accumulator chamber should be communicated with each other to ensure stable oil pressure in the low pressure system.

So, the oil control device of the present invention plays a role of a switch valve between the hydraulic driving system and the low pressure system in the hydraulic fully variable valve system. The opening time and closing time (phase angles) could be randomly adjusted within a large range along with the operation condition of the internal combustion engine. The oil control device also has the functions of sealing and energy storage and simple manufacturing process. The oil control device could meet the need of multi-cylinder internal combustion engines with different combinations and is convenient and flexible for matching application.

What is claimed is:
1. An oil control device of a hydraulic fully variable valve system for an internal combustion engine, connecting with the hydraulic valve system of an internal combustion engine, wherein the oil control device comprises a housing, a rotary valve, a hydraulic accumulator and a transmission mechanism;

the rotary valve, the hydraulic accumulator and the transmission mechanism are installed in the housing, the rotary valve comprises a rotary valve shaft and a rotary valve sleeve, the rotary valve shaft is installed in the rotary valve sleeve with gear teeth on one end thereof, and the rotary valve sleeve is installed in a cavity of the housing;

on the housing, a rack rail is provided at a position corresponding to the gear teeth of the rotary valve sleeve, and a rack in the rack rail is engaged with the gear teeth on the rotary valve sleeve;

the hydraulic accumulator installed in the cavity of the housing comprises an accumulator piston, an accumulator spring, an end cover, a sealing seat ring and a rubber gasket, the sealing seat ring and the rubber gasket are fixedly installed in the housing cavity, the accumulator piston is flexibly installed in the cavity of the housing, the end cover is fixedly installed on the end surface of the housing, and the accumulator spring which is a pressure spring is installed between the accumulator piston and the end cover; an accumulator chamber is provided between the rotary valve and the hydraulic accumulator;

the transmission mechanism comprises a transmission gear, a gear shaft and a cross slide coupling; the transmission gear is installed on the gear shaft through a connecting key, while the gear shaft is connected with the rotary valve shaft through the cross slide coupling.

2. The oil control device of a hydraulic fully variable valve system for an internal combustion engine of claim 1, wherein an axial blind hole, and a radial oil hole communicated therewith, are provided on the rotary valve shaft, a retaining ring groove is provided at one end of the rotary valve shaft, two connecting teeth matched with a teeth space of the cross slide coupling are provided at the other end;

the rotary valve shaft is installed in the rotary valve sleeve, and a retaining ring for axial positioning is installed in the retaining ring groove;

on the rotary valve sleeve, radial oil holes are provided at an axial position corresponding to the radial oil hole of the rotary valve shaft, and an annular groove is provided at the position on the radial oil hole of the rotary valve sleeve, the rotary valve sleeve with the rotary valve shaft is installed in the cavity of the housing; on the housing, a high pressure oil hole is provided at a position corresponding to the annular groove, and a low pressure oil hole is provided at a position corresponding to the accumulator chamber in axial direction;

a radial oil escape hole is provided at the bottom of the housing cavity in which the accumulator piston moves, and a vent hole is provided on the end cover.

3. The oil control device of a hydraulic fully variable valve system for a internal combustion engine of claim 2, wherein that radial oil holes of the rotary valve sleeve are uniformly provided in circumference at an axial position corresponding to the radial oil hole of the rotary valve shaft, the number of which is equal to the rotary speed ratio N of a valve train camshaft to the rotary valve shaft and N is a positive integer.

4. The oil control device of a hydraulic fully variable valve system for a internal combustion engine of claim 2, wherein a rotary valve switch set comprises a high pressure oil hole in the housing, an annular groove of the rotary valve sleeve, a radial oil hole of the rotary valve sleeve and a radial oil hole of the rotary valve shaft at the same axial position; at least one rotary valve switch set should be provided in one oil control device; the number of the rotary valve switches is equal to that of the cylinders of the internal combustion engine matched therewith for use.

* * * * *